United States Patent [19]

Petersen

[11] Patent Number: 4,870,306
[45] Date of Patent: Sep. 26, 1989

[54] METHOD AND APPARATUS FOR PRECISELY MOVING A MOTOR ARMATURE

[75] Inventor: Christian C. Petersen, Westwood, Mass.

[73] Assignee: Polaroid Corporation, Cambridge, Mass.

[21] Appl. No.: 309,464

[22] Filed: Oct. 8, 1981

[51] Int. Cl.⁴ .......................................... H02K 41/00
[52] U.S. Cl. ...................................... 310/12; 310/14; 310/30
[58] Field of Search ................................ 310/12–14, 310/30

[56] References Cited

U.S. PATENT DOCUMENTS

| | | | |
|---|---|---|---|
| 3,022,400 | 2/1962 | Von Ahlefeldt | 200/93 |
| 3,130,331 | 4/1964 | Jallen et al. | 310/14 |
| 3,149,255 | 9/1964 | Trench | 310/30 |
| 3,202,886 | 8/1965 | Kramer | 317/171 |
| 3,433,983 | 3/1969 | Keistman et al. | 310/30 X |
| 3,495,147 | 2/1970 | Flora | 310/14 X |
| 3,575,650 | 4/1971 | Fengler | 310/12 X |
| 3,707,924 | 1/1973 | Barthalon | 310/12 X |
| 3,728,654 | 4/1973 | Tada | 335/234 |
| 3,851,196 | 11/1974 | Hinds | 310/12 |
| 3,859,547 | 1/1975 | Massie | 310/304 |
| 3,869,625 | 3/1975 | Sawyer | 310/12 |
| 3,882,522 | 5/1975 | Erlichman | 354/30 |
| 3,906,262 | 9/1975 | Shichida et al. | 310/12 |
| 4,151,447 | 4/1979 | von der Heide et al. | 318/135 |
| 4,187,453 | 2/1980 | Rough | 318/135 |
| 4,220,899 | 9/1980 | von der Heide | 318/135 |
| 4,234,838 | 11/1980 | Langley et al. | 318/696 |
| 4,264,154 | 4/1981 | Petersen | 351/49 |
| 4,265,530 | 5/1981 | Petersen | 354/235 |
| 4,346,318 | 8/1982 | Shtrikman | 310/304 |
| 4,363,980 | 12/1982 | Petersen | 310/30 X |
| 4,369,383 | 1/1983 | Langley | 310/12 |
| 4,370,577 | 1/1983 | Wakabayashi et al. | 310/12 |

OTHER PUBLICATIONS

U.S. patent application Ser. No. 45,822 (now abandoned), (4,363,980).

*Primary Examiner*—Mark O. Budd
*Attorney, Agent, or Firm*—Leslie J. Payne; Alfred E. Corrigan

[57] ABSTRACT

Electromagnetic actuators are disclosed for precisely and directly incrementing an output member along a given generally linear path. Included in one actuator is a pair of assemblies, one of which is movable with respect to the other along the given path. A first of the assemblies includes means for producing a first magnetic field extending to the second actuator assembly in a manner generally transverse to the given path. The second actuator includes energizable means alongside the path and for producing a pair of opposed, approximately equal magnetic fields, spaced along the given path. Each of these opposed fields being aligned to cooperate with the transverse field to produce a force between the assemblies tending to centrally locate the assemblies with the transverse field between the pair of opposing fields.

7 Claims, 2 Drawing Sheets

METHOD AND APPARATUS FOR PRECISELY MOVING A MOTOR ARMATURE

BACKGROUND OF THE INVENTION

This invention relates, in general, to motion producing apparatus and, more particularly, to actuators of the electromagnetic kind.

A wide variety of such actuators exist. Typically, electromagnetic motors or actuators include a cylindrical bobbin about which is wound one or more field coils. Mounted within the bobbin is an armature which may be comprised of a core formed from a piece of soft iron, as shown in U.S. Pat. No. 3,728,654, or it may be comprised of a plurality of permanent magnets, such as shown in U.S. Pat. Nos. 3,022,400, 3,202,886 and 3,495,147, or the armature may be a combination of a core and a permanent magnet. Through the application of direct current in one direction to the field coil, a magnetic field is generated for producing a force sufficient for driving the armature in a given direction. Reverse application of the direct current to the field coil causes the armature to be driven in the opposite direction.

In commonly assigned and copending application Ser. No. 45,822, entitled "Linear Motor", filed June 5, 1979, by the applicant of the instant invention, there is disclosed an improved actuator which automatically returns a movable armature to an original position upon deenergization. In commonly assigned U.S. Pat. No. 4,265,530, entitled "Shutter Blade Drive System", issued May 5, 1981, by the applicant of the instant application, there is disclosed a photographic apparatus employing a linear motor for controlling the indexing of a shutter mechanism. Besides the linear motor, use is also made of an electromagnetic coupling device which is energized when the motor is energized. The coupling device serves, upon energization, to interconnect the motor armature to the shutter mechanism. Deenergization of both motor and coupling device allow the armature to return to its original position. Thus, for every incremental advance of the shutter the armature and coupling device travel a single stroke and then must return to their original positions for another stroke to incrementally advance the shutter. In commonly assigned U.S. Pat. No. 4,264,154, entitled "Apparatus for Automatically Controlling Transmission of Light Through a Lens System", issued April 28, 1981, by the applicant of the instant invention, there is disclosed a linear motor and coupling device similar to the last-noted type which indexes a polarized lens element.

The foregoing actuators are extremely effective and are also miniature. They can be used in a variety of situations where space, weight and low electric power consumption are desired. Despite their many advantages, however, there are certain drawbacks connected with their use. One is the fact that each armature itself cannot be incrementally advanced to a plurality of linear positions. Because of this, each of such actuators must operate with an additional electromagnetic coupling device to achieve incremental advance of the output member. Moreover, because such actuators rely on mechanical stops precise positioning of the output member is a potential problem.

Commonly assigned U.S. Pat. No. 3,882,522, issued May 6, 1972, discloses use of a rotary stepping motor for supplying motive power to shutter blades. A shortcoming of rotary actuators is that they require mechanical converters for converting rotor motion to a linear driving output motion. Stated otherwise, they cannot directly linearly drive an output member. Thus, there is a possibility that the rotor can be driven, by its own momentum, beyond any desired position.

SUMMARY OF THE INVENTION

It is an object of the present invention to provide an improved electromagnetic actuator which overcomes or minimizes the drawbacks mentioned above. According to the present invention there is provided an electromagnetic actuator having a pair of actuator assemblies, one of which is movable with respect to the other along a given path.

In an illustrated embodiment, a first actuator assembly includes means for producing a first magnetic field extending to the second assembly in a manner generally transverse to the given path. The other actuator assembly includes energizable means located alongside the given path. The energizable means produces a pair of opposed, approximately equal magnetic fields spaced along the given path. Each of the opposed fields being aligned to cooperate with the transverse field to produce a force between the assemblies tending to centrally locate the assemblies with the transverse field between the pair of opposing fields.

The other one of the first and second assemblies includes a plurality of spaced apart energizable means. Each of these energizable means is adjacent to and positioned generally transversely with respect to the given path. When energized each of the energizable means establishes magnetic fields having opposite senses of direction than the adjacent ones of the energizable means. Adjacent ones of the energizable means are spaced by a distance generally equal to or less than the given distance. Thus, when one of the energizable means is positioned within the transverse field of the one assembly and energized, it interacts with the transverse field to cause one of the first or second assemblies to be driven along the path in the given direction, whereby the adjacent one of the energizable means in the direction of movement of the one relatively movable assembly becomes effective, whereupon the opposite magnetic field of this adjacent energizable means interacts with the transverse field in such a manner as to create an equal and opposing force which generally centrally locates the movable one assembly at a desired position along the path between the pair of opposing force fields.

There is disclosed a method of selectively moving one of a pair of actuator assemblies relative to the other along a given path, wherein, the first of the actuator assemblies includes means for producing a first magnetic field extending to the second of the actuator assemblies in a manner transverse to the given path; the second actuator assembly includes energizable means located alongside the given path for producing a pair of opposed, approximately equal magnetic fields, spaced along the given path. Each of the opposed fields is arranged to cooperate with the transverse field to produce a force between the assemblies tending to centrally locate the movable assembly with the given transverse field between the pair of opposing fields, comprising the step of energizing the energizable means to produce the opposed fields which interact with the transverse field to produce a force between the assemblies tending to centrally locate the movable assemblies relative and between the opposed fields.

Among the objects of the invention are, therefore: the provision of an improved actuator for generating movement along a given path; the provision of an improved actuator for precisely incrementing one of a pair of actuator assemblies to directly increment an output member along the linear path; the provision of an improved actuator for precisely incrementing an output member bidirectionally along a generally linear path; the provision of an improved actuator which has the characteristics mentioned above and which is relatively small in size, constructed of relatively few components and requires low power consumption for operation; the provision of a method of precisely incrementally advancing an output member; the provision of a method of moving a member along a given path by incrementally advancing one of the actuator assemblies of the actuator.

Other objects and further scope of applicability of the present invention will become apparent from the detailed description to follow when taken in conjunction with the accompanying drawings, wherein like parts are designated by like reference numerals.

DETAILED DESCRIPTION

Figure 1:
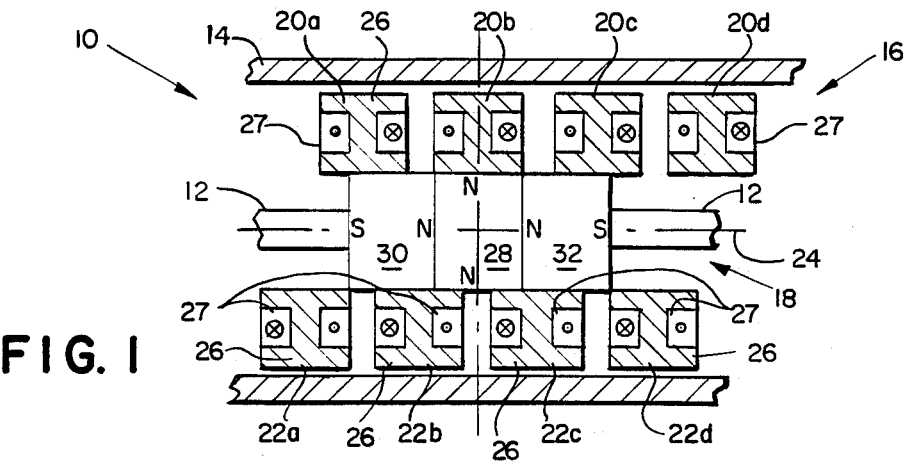
FIG. 1 is a schematic illustrating components of the actuator of this invention when in one position.

FIG. 1 shows one embodiment of an electromagnetic actuator 10 made in accordance with the present invention. As will be explained and understood in the following description, the actuator 10 is selectively controlled for precisely controlling bidirectional displacement of output members 12 to a plurality of preselected spaced positions.

As illustrated, the actuator 10 includes housing 14, stator assembly 16 and bidirectionally displaceable armature assembly 18. The displaceable output members 12 are shown attached to opposite longitudinal ends of the armature 16 and can operate any number of devices not shown and not forming part of this invention.

Figure 1A:
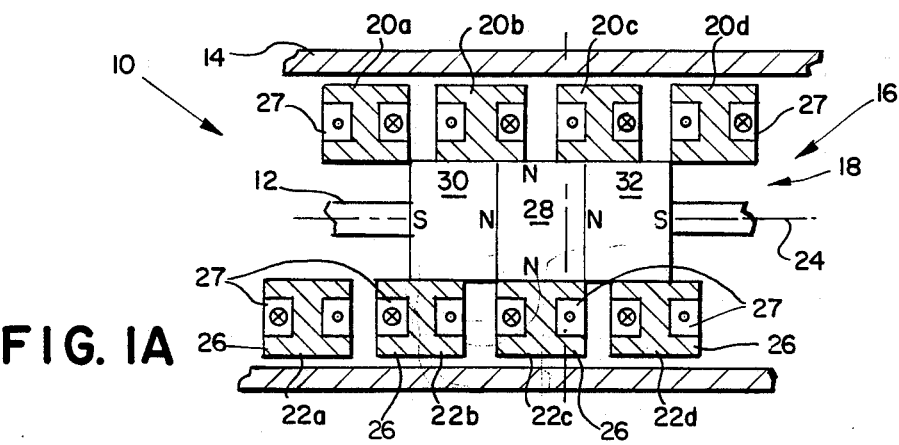
FIG. 1A is a schematic similar to FIG. 1, but showing the actuator components in a different position.
Figure 1B:
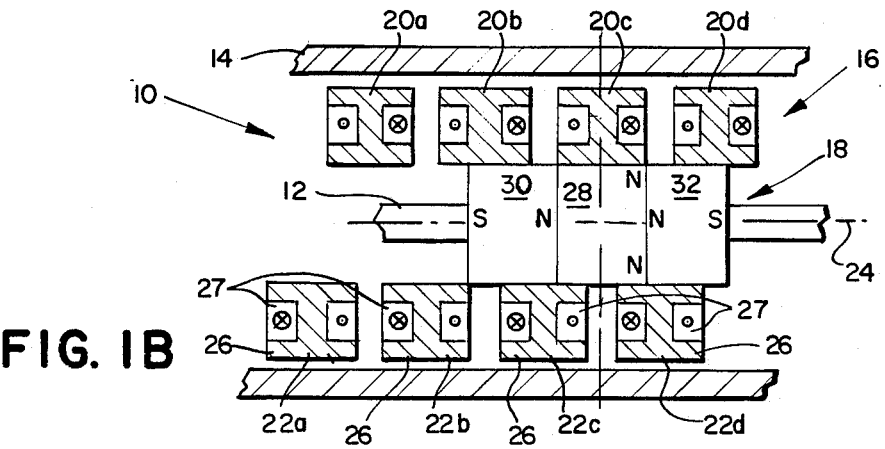
FIG. 1B is a schematic similar to FIG. 1A, but showing the actuator components in yet another position after being incrementally advanced.
Figure 1C:
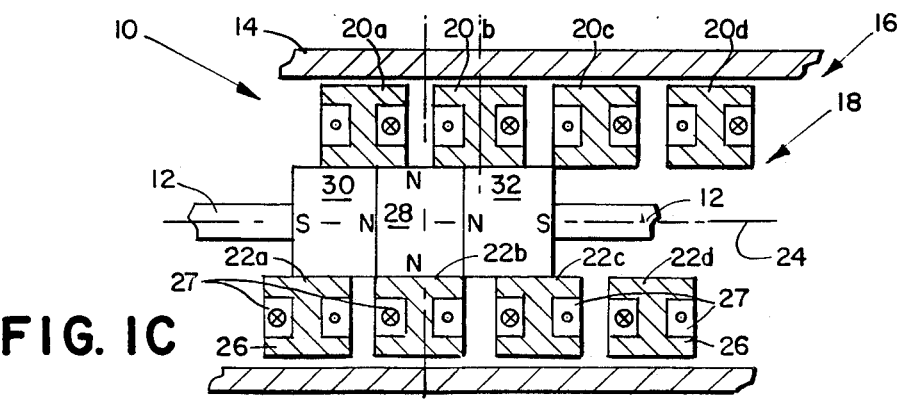
FIG. 1C is a schematic similar to FIG. 1, but showing the actuator components in still another position after being actuated.

Referring to FIGS. 1-1C, the housing 14 is a tubular casing made of a ferromagnetic material, such as steel, and is constructed to surround generally both the stator assembly 16 and the armature 16. In this embodiment, the stator assembly 16 is affixed by means not shown to the housing 14, while the armature 16 is relatively movable with respect to the stator assembly. Included in the stator assembly 16 is a pair of spaced apart and generally parallel sets of energizable field coils 20a-d and 22a-d. These field coils 20a-d, 22a-d provide electromagnetizable or energizable means for selectively producing magnetic fields capable of extending to the stator assembly 16. The coils in each set of field coils are arranged in side-by-side fashion. It is pointed out that the field coils 20a-d are arranged to be linearly offset or staggered from the field coils 22a-d such as shown in FIGS. 1-1C. The significance of such a staggered relationship will be subsequently made apparent. As illustrated, the field coils 20a-d, 22a-d define a generally linear path having an axis 24. It will be appreciated, of course, that the field coils 20a-d, 22a-d could be arranged in a curvilinear fashion as well.

Each of the field coils 20a-d, 22a-d includes an elongated bobbin or spool 26 made, preferably, from a non-conducting, non-magnetic material, such as Delrin which is a thermoplastic resin sold by E. I. duPont de NeMours & Co. of Wilmington, Delaware. Mounted on each of the bobbins 26 is a continuous electrically conductive winding 27.

For purposes of better understanding the operation of this invention, the winding portions 27 on opposite halves of each of the bobbins 26 are shown illustrated by the encircled symbols "x" and the symbols "o". The encircled symbols "x" indicate that the flow of current through those winding portions of the field coils is going into the plane of the drawing, while the symbols "o" indicate that current flowing through those winding portions of the coils is traveling out from the plane of the drawing. The polarity of the current passing through the field coils can be controlled. Each of the field coils 20a-d, 22a-d generates a magnetic field such that opposite halves of the windings of each of the coils create fields whose strength and sense of direction is generally equal and opposite to the other along the axis of movement.

Continued reference is made to FIGS. 1-1C for describing the armature 18. In this embodiment, the armature 18 is defined as a thin, longitudinally extending member. It includes a steel core piece 28 and two axially aligned permanent magnets 30, 32. The core piece 28 can be made from any magnetically-permeable material. Preferably, the permanent magnets 30, 32 are formed from a rare earth material, such as samarium cobalt. Each of the permanent magnets 30, 32 has its magnetic north pole fixedly secured to an end face of the core piece 28.

The magnetic south poles S of the magnets 30, 32 define the opposite magnetic ends of the armature 18. Each of the output members 12 is attached to an opposite end of the permanent magnets 30, 32. Thus, whenever the actuator 10 is operated to incrementally displace the armature 18, the output members 12 can be directly incremented. Advantageously, this provides for a simple, compact and reliable way for driving the output members in rectilinear fashion.

In this embodiment, the armature 18 is supported by the bobbins 26 and moves relative to the field coils 20a-d, 22a-d. Other arrangements for supporting the armature 18 for relative movement can be provided. The illustrated embodiment provides a particularly thin actuator. Small size, of course, facilitates miniaturization of devices using actuators of this kind. Moreover, the actuator 10 is relatively simple, compact, inexpensive and does not require much electrical power for its operation. For illustrative purposes only, the length of a bobbin along the axis of movement can be 0.1 inches and the length of the core 28 the same. The spacing between the centers of adjacent field coils can be approximately 0.1 inches. In this manner, the transverse field will accommodate adjacent winding portions of adjacent field coils. Moreover, the length of the permanent magnets is also 0.1 inches; the width of the armature 18 and magnets can be 0.1 inches and their depth 0.1→1 inches. Thus, an extremely compact actuator can be provided.

Returning back to the core piece 28, it serves to direct the magnetic flux, emanating from the commonly facing magnetic north poles N of the permanent magnets 30, 32, generally outwardly from its periphery and transversely with respect to the longitudinal axis 24 so as to extend to and through the field coils 20a–d and 22a–d. The steel housing 14 assists the ballistic effect of the transverse field so that the length of the transverse remains substantially the same as it passes through the field coils. Because of the foregoing arrangement, the axial extent of the transverse field will extend the axial length of the core piece 28. Thus, the axial extent of the transverse field can be accurately controlled. The effective length of this field is important as will be described later since movement and stopping is controlled by the interaction of this field with the electromagnetic fields produced by the field coils.

Although in this embodiment the north magnetic poles of the permanent magnets 30, 32 face each other, the invention envisions that south magnetic poles face each other. Thus, the transverse field defined by the core piece 28 would have a south polarization as well. Besides a solid core 28, an air gap can be used between the opposing north magnetic poles of the permanent magnets 30, 32. Such arrangement allows the flux of the magnets 30, 32 to travel generally transversely in the manner described. In this latter instance, of course, the permanent magnets 30, 32 would be suitably interconnected for moving in unison with each other.

With continued reference to FIGS. 1–1C, it will be noted that the opposing north magnetic poles N of the magnets 30, 32 are spaced apart by a given distance This distance is such as to substantially encompass adjacent pairs of energized portions on the field coils 20a–d, 22a–d. When viewing FIG. 1, it will be seen that the length of the core 28 is substantially equal to the width of a bobbin 26. Also, the length bridges adjacent halves of the windings on the field coils 22b, 22c. Due to this spacing the transverse field can intercept the equal and opposite electromagnetic forces generated by the opposing active portions of the field coils. As will be described more fully, any one of the adjacent pairs of winding portions in each of the sets provides opposing magnetic fields. These fields serve to provide a magnetic detent for the transverse field of the core 28. Thus, the detenting, in effect, arrests movement of the armature 18 in a given position as well as retains it in such position. Windings 27 of the field coils 20a–d, 22a–d are supplied with electric power, from preferably a DC power source, (not shown). Also not shown and not forming part of this invention is the control circuit to which the field coils 20a–d, 22a–d are connected so that the current to each coil can be independently controlled and the polarity reversed.

The operation of the actuator 10 shown in FIGS. 1–1C is hereinafter described. Assume it is desired to operate the actuator 10 so as to displace the armature 18 from the position shown in FIG. 1 to that illustrated in FIG. 1A. It is pointed out that the armature 18 has been maintained in the FIG. 1 position because the field coil 20b is energized. In this manner, the opposing electromagnetic fields created by the windings of coil 20b will produce field strengths having opposite senses of direction. Thus, the equal but opposing forces serve to maintain the core 28 and its transverse field centered therebetween. For effecting the incremental rightward linear displacement, the field coil 22c is energized by the control circuit while the field coil 20b is deenergized. As a result, the electromagnetic field provided by the active runs in the field coil 22c, which are intercepted by and interact with the transverse field, causes the armature 18 to move. As the armature 18 so moves, the opposite coil windings of the field coil 22c create an opposing electromagnetic force field to the other half of the winding of field coil 22c. This opposing field is then progressively intercepted by the transverse field. Movement of the armature 18 continues and is progressively resisted by the field generated by the opposing windings until both opposing winding portions of the field coil 22c are completely simultaneously intercepted by the transverse field. When this occurs, the armature 18 is stopped with the transverse field positioned between the opposing fields of the field coil 22c. (See FIG. 1A) Because of this detenting the armature 18 will be precisely stopped at its desired null position without need for a mechanical stop. Moreover, the probability of the armature 18 being carried past this position by its own momentum during rightward movement is significantly minimized.

For effecting the next successive incremental displacement rightwardly, the field coil 20c is energized while the field coil 22c is deenergized. Thus, the active winding portions of the field coil 20c, which are within and interact with the transverse field, cause rightward movement. Such movement continues and is progressively resisted by the opposing winding portion of the same field coil 20c. When such latter winding portions are completely intercepted by the transverse field, armature 18 is positively arrested at a new position; see FIG. 1B.

Thus, sequential energization of consecutive alternate ones of the field coils in the direction of desired armature displacement causes precise incremental displacement of such armature in the manner indicated above. In this regard, further advancement of the armature 18 rightwardly is achieved when the field coil 22d is energized and the field coil 20c is deenergized.

Reference is now made to both FIGS. 1 and 1C for describing movement of the armature 18 leftwardly from the position in FIG. 1. To initiate leftward movement, it will be appreciated that the field coil 20b is deenergized while the field coil 22b is energized. Thus, the energized winding portions of the field coil 22b within the transverse field interact with the latter and cause movement of the armature 18 leftwardly. This movement continues and is progressively resisted when the remaining energized winding portions of the field coil 22b become progressively intercepted by the transverse field. The armature 18 is stopped when both counteracting electromagnetic forces created by the field coil 22b are encompassed by the transverse field.

Figure 2:
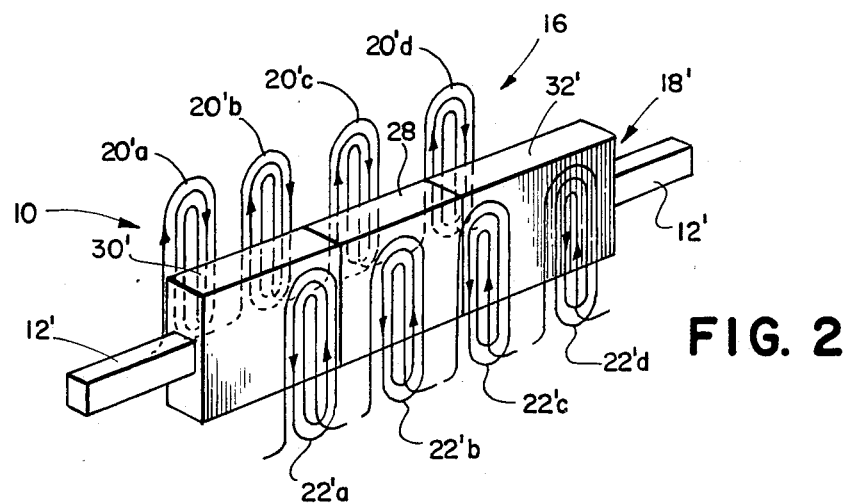
FIG. 2 is a schematic perspective view showing another embodiment of the present invention.

Reference is made to FIG. 2 for schematically showing another embodiment of the present invention. In this embodiment, the similar structure will be indicated by like reference numerals with, however, the addition of a prime marking.

It will be understood that the armature 18' can be displaced incrementally and bidirectionally as with the previous embodiment through the successive energization of alternate ones of the opposed sets of field coils 20'a–d, 22'a–d as in the manner explained above. In this embodiment the field coils 20'a–d, 22'a–d are in a generally pancake arrangement and are not wound on bobbins. It will be appreciated that the field coils 20'a–d and 22'a–d can be encased in suitable plastic printed circuit type jackets (not shown) which support the armature 18' for sliding incremental movement. Advantageously, this can provide for a more compact actuator 10'. It is seen that opposite halves of each of the field coils 20'a–d, 22'a–d have the current flowing in opposite directions, as indicated by the arrows on opposite sides of an imaginary vertical axis for each of the pancake-type coils. In this regard, it will be appreciated that each of the field coils 20'a–d, 22'a–d is a continuous conductive loop having terminal end portions connected to a suitable direct current source of power as well as control circuitry which can effect the kind of selective energization of the field coils to bring about the desired incremental movement in either direction, as explained above in the last embodiment.

Figure 3:
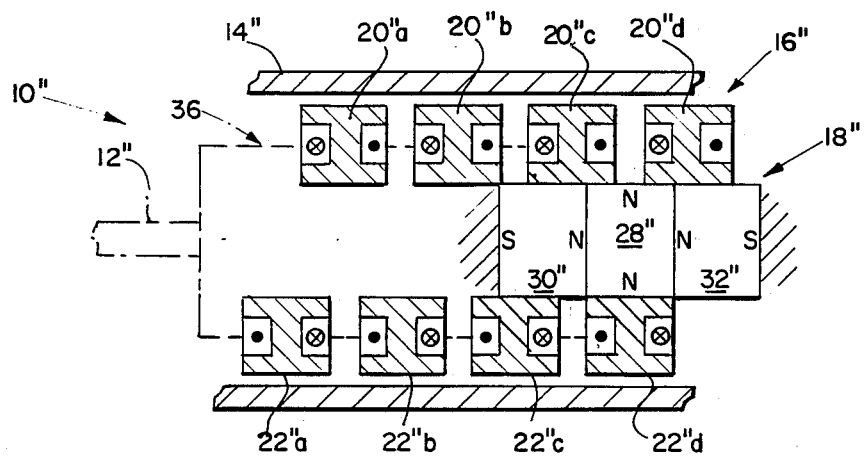
FIG. 3 is a schematic of another embodiment of the actuator of the present invention.

Referring now to FIG. 3, there is shown another embodiment of this invention. In this embodiment, structure similar to that of the first embodiment will be indicated by the same reference numeral with, however, the addition of a double prime marking. This embodiment differs basically from the others in that the stator assembly 16" is incrementally and bidirectionally movable with respect to a stationary armature assembly 18". In this regard, field coils of the opposing sets of field coils 20"a–d, 22"a–d are suitably mechanically interconnected, as indicated by phantom lines 36. This allows the field coils 20"a–d and 22"a–d to move in unison. Thus, instead of the stator assembly 16"being affixed to the housing 14", it is suitably supported for bidirectional movement with respect thereto. It will be appreciated that the incremental movement of the stator assembly 16" relative to the armature 18" is achieved in a like manner to that described in connection with the previously described embodiments.

It should be noted that the actuators described above need not be restricted to a single moving element, but may ultimately contain multiple individually controllable elements. Positional control of the armatures is usually obtained by digital step-by-step techniques. The actuators are not restricted to open or closed loop control.

By reason of this invention, highly miniature electromagnetic actuators can be provided which positively, precisely and directly increment output members without need for, among other things, motion converting mechanisms which convert one type of motion to another and mechanical stops which imprecisely stop armature movement. Also, these actuators greatly minimize the potential problem of moving armatures overshooting desired positions during incrementing, such as occurs in rotary stepper motors.

Since certain changes may be made in the abovedescribed method and apparatus without departing from the scope of the invention herein involved, it is intended that all matter contained in the description or shown in the accompanying drawings shall be interpreted as illustrative and not in a limiting sense.

I claim:

1. In an electromagnetic actuator having a pair of actuator assemblies relatively movable with respect to each other for generating incremental movement to an output member to a plurality of positions along a given path in at least one of two opposite given directions, the improvement wherein:

one of said pair of assemblies includes means for establishing a magnetic field of one polarization for allowing said magnetic field to be directed generally transversely along a given distance to the other of said pair of assemblies;

said other assembly including a plurality of spaced first means selectively operable for establishing a plurality of electromagnetic fields each of which is selectively cooperable with said transverse field for creating a first electromagnetic force tending to drive one of the pair of relatively movable assemblies in said one given direction, and a plurality of second means arranged in alternating relationship with said first means and being operable for establishing a plurality of electromagnetic fields each of which is selectively cooperable with said transverse field for creating a second electromagnetic force tending to drive the one relatively movable assembly in the other of the two directions with a force generally equal to that created by the first means;

adjacent pairs of said first and second means being grouped in a space so that said given distance of said transverse field at least encompasses substantially equal sections of the adjacent pairs of said first and second means such that when the fields of energized adjacent pairs of said first and second means are intercepted by said transverse field they arrest movement of said one movable assembly and maintain it at one of the plurality positions, which position is generally between said intercepted adjacent energized pair of said first and second means, and further whereby movement in either of said two directions is achieved by selectively energizing only one of said adjacent pair of said first and second means intercepted by the transverse field.

2. In an electromagnetic actuator having at least a pair of actuator assemblies for generating incremental movement along a given path in at least one given direction, the improvement wherein:

one of said pair of assemblies includes means for producing a permanent magnetic field and for allowing said magnetic field to be directed generally transversely along a given distance to the other of said first and second assemblies;

said other one of said pair of assemblies includes a plurality of spaced electromagnetizable means, said electromagnetizable means when energized provide equal and opposite electromagnetic fields with respect to the adjacent ones of said electromagnetizable means, any adjacent pair of said electromagnetizable means is grouped within a space so that said given distance of said transverse field at least encompasses substantially equal sections of adjacent pairs of electromagnetizable means, whereby when one of said electromagnetizable means is energized it can interact with said transverse field to cause one cf the relatively movable pair of assemblies to move along the path in the given direction to drive an output member wherein said transverse field is moving relatively to said other one of said assemblies and is intercepted by an adjacent energized one of said electromagnetizable means in the given direction so as to interact therewith to arrest movement of the movable one of said assemblies at a desired one of the positions which is between said intercepted pair of energized adjacent pair of electromagnetizable means, and whereby continued incremental movement of the movable assembly is achieved by keeping the one of the intercepted energizable means energized which will drive the movable assembly in the given direction until the successive adjacent energized one of said electromagnetizable means in the given direction and intercepted by said transverse field arrests movement of the movable assembly between the adjacent energized pair of electromagnetizable means.

3. The actuator of claim 2 wherein said one assembly includes a core member and at least a pair of permanent magnets generally spaced apart by said given distance and being arranged so that opposing end portions of said magnets facing each other have the same magnetic polarization and are coupled to said core member so as to direct the magnetic field of said permanent magnets in the generally transverse direction.

4. The actuator of claim 2 wherein said electromagnetizable means are arranged in a pair of rows, wherein each row has the electromagnetiable means in generally side-by-side relationship and wherein each of said rows are arranged along said path on opposite sides of said one assembly.

5. The actuator of claim 2, 3, or 4 wherein said permanent magnets are of the rare earth type.

6. A method of selectively incrementing an output member to a plurality of positions along a given path in at least one of two opposite given directions by an electromagnetic actuator having a pair of actuator assemblies relatively movable with respect to each other wherein one of the pair of assemblies includes means for establishing a magnetic field of one polarization for allowing the magnetic field to be directed generally transversely along a given distance to the other of the pair of assemblies, and the other assembly including a plurality of spaced first means selectively operable for establishing a plurality of electromagnetic fields each of which is selectively cooperable with the transverse field for creating a first electromagnetic force tending to drive one of the pair of relatively movable assemblies in the one given direction, and a plurality of second means arranged in alternating relationship with the first means and being operable for establishing a plurality of electromagnetic fields each of which is selectively cooperable with the transverse field for creating a second electromagnetic force tending to drive the one relatively movable assembly in the other of the two directions with a force generally equal to that created by the first means wherein adjacent pairs of the first and second means are grouped in a space so that the given distance of the transverse field at least encompasses substantially equal sections of the adjacent pairs of the first and second means such that when the fields of energized adjacent pairs of the first and second means are intercepted by the transverse field they arrest movement of the one movable assembly and maintain it at one of the plurality positions, which position is generally between the intercepted adjacent energized pair of the first and second means comprising the steps of:

deenergizing only one of the intercepted pair of first and second means so as to move the one relatively movable assembly in the given direction; and stopping the moving assembly at a next successive one of the plurality of positions, which position is between another adjacent pair of the first and second means intercepted by the transverse field in the one given direction by energizing the next successive one of the energizable first and second means in the given direction of movement of the moving assembly so as to create an equal opposing force on the movable assembly for stopping the same.

7. In an electromagnetic actuator having a pair of actuator assemblies, one of which is movable with respect to the other along a given path, the improvement wherein:

a first of said actuator assemblies includes means for producing a first magnetic field extending to the second of said actuator assemblies in a manner transverse to said given path; and said second actuator assembly includes a plurality of coils successively located along said given path, each of said coils producing when energized, a pair of opposed approximately equal electromagnetic fields spaced apart from each other along said given path, each of said opposed electromagnetic fields being arranged to cooperate with said given transverse field in such a manner as to produce a force between said assemblies tending to centrally locate said assemblies with said given transverse field between one of said pairs of opposing electromagnetic fields, said coils being aligned in a plane generally normal to said transverse field.

* * * * *